Nov. 1, 1938. J. B. SWAN Re. 20,905

SANDER DEVICE

Original Filed July 17, 1937

Inventor

John B. Swan

By Clarence O'Brien
Hyman Berman

Attorneys

Reissued Nov. 1, 1938

Re. 20,905

UNITED STATES PATENT OFFICE 20,905

SANDER DEVICE

John B. Swan, Gladstone, Mich.

Original No. 2,110,247, dated March 8, 1938, Serial No. 154,263, July 17, 1937. Application for reissue June 30, 1938, Serial No. 218,306

2 Claims. (Cl. 291—46)

This invention relates to a sander device for placing sand on tracks, the general object of the invention being to provide a shield or skirt for the lower end of the discharge pipe, which facilitates the discharge of the sand from the pipe onto a rail by protecting the sand from air currents and from moisture, and the invention also relates to the manner of connecting the skirt or shield to the pipe.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1:
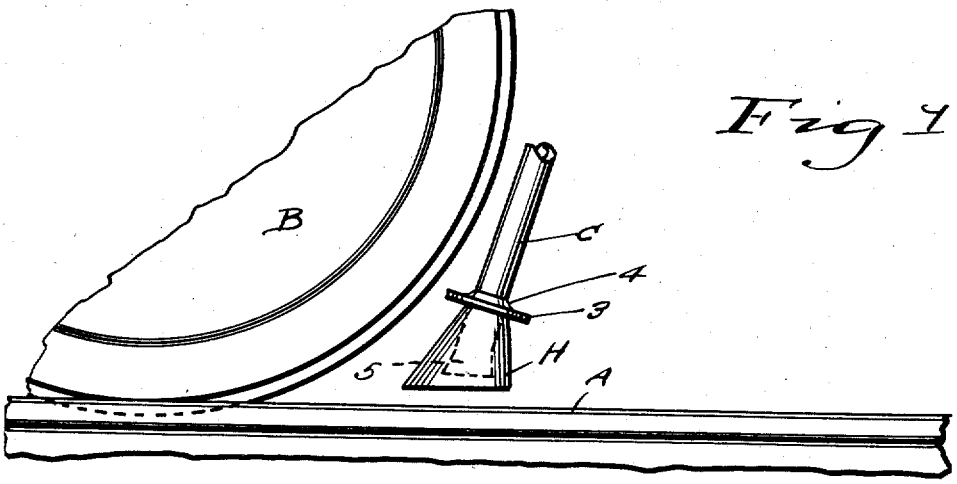
Figure 1 is a fragmentary elevation showing how the sand pipe is arranged relative to a wheel of a vehicle and the rail on which the wheel travels.
Figure 3:
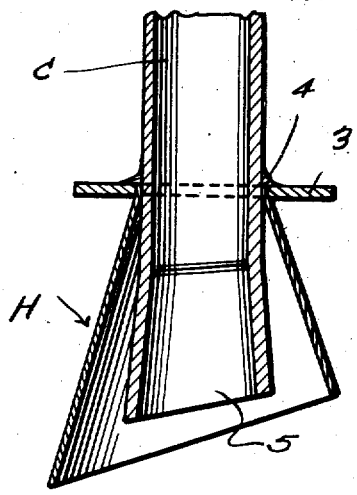
Figure 3 is a section on line 3—3 of Figure 2.
Figure 2:
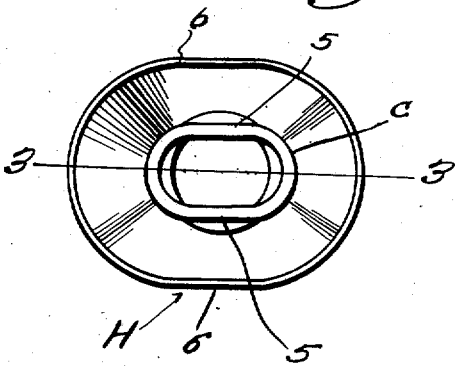
Figure 2 is a bottom plan view of the lower end of the discharge pipe and the hood.
Figure 4:
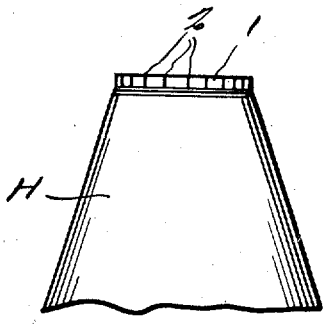
Figure 4 is a view of the hood or skirt.

As shown in Figure 1, means are provided for discharging sand upon a rail A of a track in front of a wheel B of a vehicle traveling on the track, such means including a discharge pipe C, which leads to a sand reservoir, and means for causing the sand to flow down the pipe and drop from its lower end upon the rail.

It has been found that air currents, rain, snow and the like will interfere with the discharge of the sand from the pipe, and in order to prevent such interference, a hood or skirt has been provided for the lower end of the pipe, which encloses said lower end and extends beyond the same. This invention improves the construction of the hood and the manner of attaching it to the sand pipe.

In the drawing, the hood is shown at H and flares downwardly from a substantially short, cylindrical upper end 1, which is formed with the slits 2. This slitted end 1 is pushed up over the pipe C to the desired position, and then a washer 3 is forced over the part 1 and said part 1 and the washer are welded to the pipe C, as shown at 4.

The lower end of the pipe C is flattened at its sides so that the lower part of the pipe is of substantially oblong form, as shown at 5, and the lower part of the hood is of the same shape, with its flattened sides 6 opposite the flattened sides 5 of the pipe. The end of the pipe and the end of the hood slope downwardly and rearwardly, relative to the direction of travel of the vehicle, but the end of the hood has a greater slope than the end of the pipe.

Thus it will be seen that the hood will protect the end of the pipe and the sand dropping therefrom from the elements, and water running down the pipe C will be deflected by the washer and the hood from the lower end of the pipe. Also, the hood can be easily and quickly placed on any discharge pipe and the lower end of the pipe is flattened, as shown.

It is thought from the foregoing description that the advantages and novel features of the invention will be readily apparent.

It is to be understood that changes may be made in the construction and in the combination and arrangement of the several parts, provided that such changes fall within the scope of the appended claims.

Having described the invention, what is claimed as new is:—

1. In combination with a discharge pipe of a sanding device, a downwardly flaring hood having a short cylindrical portion at its upper and small end, said portion having vertical slits therein and said portion snugly fitting around a lower portion of the discharge pipe and a large washer having a centrally arranged opening therein fitting over the split end of the hood and said washer being welded to the pipe and to said split end, said washer extending at substantially right angles to the discharge pipe.

2. In combination with a discharge pipe of a sanding machine, a downwardly flaring hood having a substantially cylindrical small upper end fitting around a lower portion of the discharge pipe, a large washer fitting around the small end of the hood and extending at substantially right angles to the discharge pipe and means for connecting the washer and said small end of the hood to the discharge pipe, said large washer being of such diameter as to substantially overlie and protect the downwardly flaring hood.

JOHN B. SWAN.